United States Patent [19]

Bladh

[11] Patent Number: 4,686,738

[45] Date of Patent: Aug. 18, 1987

[54] CABLE LEAD-IN DEVICE

[75] Inventor: Ake Bladh, Lanna, Sweden

[73] Assignee: Elektro-Bladh AB, Bredaryd, Sweden

[21] Appl. No.: 777,408

[22] Filed: Sep. 18, 1985

[30] Foreign Application Priority Data

Sep. 26, 1984 [SE] Sweden .................... 8404815

[51] Int. Cl.⁴ ............................................. A41D 13/00
[52] U.S. Cl. ...................................... 16/2; 174/65 SS; 439/460
[58] Field of Search ........................... 16/2; 174/65 SS; 285/161; 403/195, 197, 201; 339/103 R, 103 M

[56] References Cited

U.S. PATENT DOCUMENTS

| 3,984,168 | 10/1976 | Korman | 339/103 C |
| 3,989,340 | 11/1976 | Sheldon et al. | 339/103 C |
| 4,116,472 | 9/1978 | Schmitt | 285/161 |
| 4,375,011 | 2/1983 | Grunau | 174/65 SS |
| 4,490,576 | 12/1984 | Bolante et al. | 174/65 SS |
| 4,515,991 | 5/1985 | Hutchison | 174/65 SS |

FOREIGN PATENT DOCUMENTS

| 60889 | 9/1982 | European Pat. Off. |
| 319905 | 10/1929 | United Kingdom |
| 927057 | 5/1963 | United Kingdom |
| 1513847 | 11/1978 | United Kingdom |
| 1543678 | 4/1979 | United Kingdom |
| 2013430 | 8/1979 | United Kingdom |
| 2055256 | 2/1981 | United Kingdom |
| 2056194 | 3/1981 | United Kingdom |
| 2089586 | 6/1982 | United Kingdom |
| 2095051 | 9/1982 | United Kingdom |

Primary Examiner—E. R. Kazenske
Assistant Examiner—James L. Wolfe
Attorney, Agent, or Firm—Burns, Doane, Swecker & Mathis

[57] ABSTRACT

A cable lead-in device comprises a nipple (1) which has a thread (3) to be secured in the casing (2) of an apparatus, a grip portion (4) and a through bore (5) for a cable. The nipple has a clamping portion comprising a thread (8) and a number of longitudinal fingers (9) with conical end surfaces (11), and a sealing ring (13) to be clamped around the cable when a nut (6), with an internal thread (7), is tightened on the clamping portion of the nipple. The nut (6) has a conical surface (12) for cooperating with the fingers (9), and a locking part (14) surrounding the cable and directed obliquely inwardly, both radially and axially, towards the cable and the fingers (9), respectively. The locking part (14) is so disposed that it will be moved or turned axially outwards into a position in which it tightly engages the cable when the nut (6) is tightened. The locking part (14) is in the form of a conical, preferably radially slotted (15) annular wall whose radially inner edge (16) may be toothed (17) to allow relative rotation of the cable and the nut in one direction only.

20 Claims, 5 Drawing Figures

CABLE LEAD-IN DEVICE

The present invention relates to a cable lead-in device of the type comprising a nipple with a bore for the cable and a clamping member with a bore, which can be screwed on the nipple and has a clamping surface for cooperating with a cable-clamping portion of the nipple, such that this portion is clamped around the cable for retention thereof.

Different types of cable lead-in devices are previously known in the art. A common feature of these prior art devices is that they comprise a nipple which, at one end, has a number of conically or axially directed fingers or clamping jaws with external, substantially conical surfaces cooperating with a corresponding internal conical surface in a nut or the like, thereby to bring about a compression of the fingers or jaws radially inwardly when the nut is tightened.

Cable lead-in devices of this type may in many cases function quite satisfactorily, at least under conditions of static load. However, if such a cable lead-in device is used under conditions of dynamic load, for exmaple in an automatically operating machine where the cable is continuously moving, there is a risk that the cable lead-in device will not function with sufficient reliability. Thus, it often happens that the nut loosens in applications of this type or that the cable is not maintained sufficiently solidly in the axial direction. It goes without saying that such an insufficient grip about the cable may cause damage to the machine equipment.

The present invention thus has for its object to provide a cable lead-in device of the type mentioned by way of introduction, which is so designed that it provides for an improved grip about the cable and also efficiently prevents the clamping nut from loosening.

According to the invention, this object is achieved by means of a cable lead-in device comprising a nipple having a bore for a cable, said nipple having a cable-clamping portion which can be brought into a cable-engaging position; and a clamping member which has a bore and can be screwed on the nipple and said cable-clamping portion and which has a clamping surface for cooperating with said cable-clamping portion, the device being characterized in that the clamping member has a locking part directed obliquely inwardly towards the cable and the cable-clamping portion of the nipple and adapted, by cooperating with said cable-clamping portion, to be brought into a cable-engaging position upon tightening of said clamping member.

According to another aspect of the invention, the locking part suitably is in the form of a substantially conical, annular wall surrounding the bore of the clamping member, the cable-clamping portion is in the form of a number of substantially axial fingers disposed at one end of the nipple and surrounding the bore of the nipple, and the fingers are adapted with their free end portions to displace the annular wall axially outwardly upon tightening of the clamping member.

One embodiment of the invention which is especially well suited for preventing the clamping nut of the cable lead-in device from coming loose is characterized in that the radially inner edge of the locking part, which is arranged for engaging the cable, is provided with teeth or barbs to allow relative rotation of the locking part and the cable in one direction only.

Another embodiment of the invention which provided for extraordinary safety against extraction of the cable is characterized in that the locking part has a number of slots extending outwardly away from its inner edge designed for engaging the cable.

The invention will now be described in greater detail hereinbelow with reference to the accompanying drawings, in which.

Figure 1:
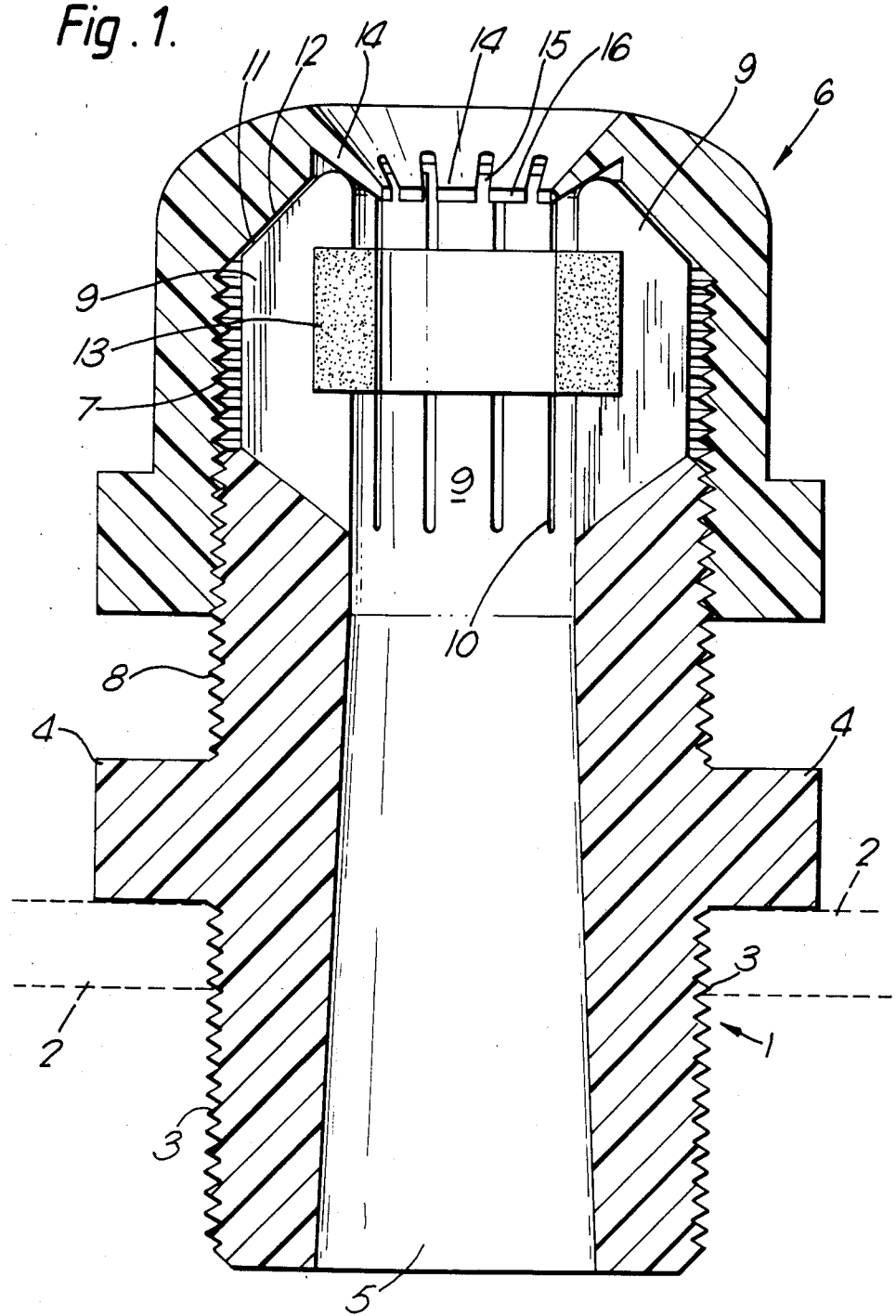
FIG. 1 is a longitudinal section of a cable lead-in device when mounted and prior to tightening thereof.
Figure 4:
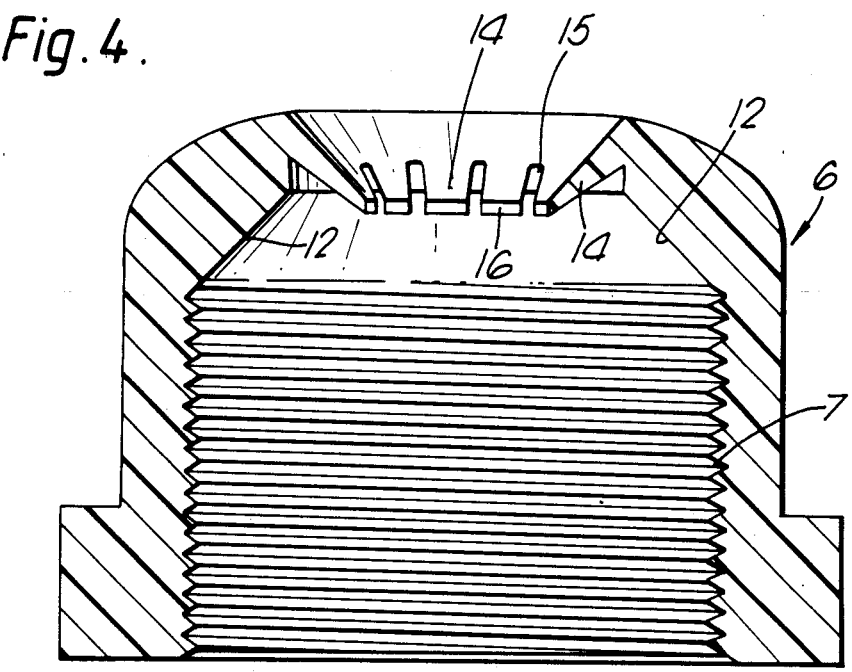
FIG. 4 is an exploded view of the clamping nut and the nipple of the cable lead-in device, both in a diametrical longitudinal section.
Figure 4:
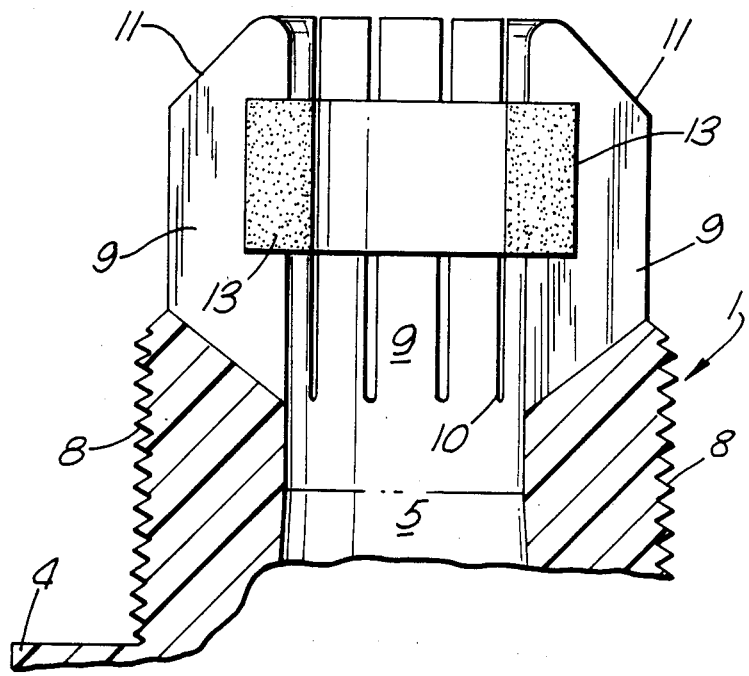

From the figures, especially FIGS. 1 and 4, it appears that the cable leadin device comprises a fixed part in the form of a nipple 1 which is intended to be fixed, for instance in the casing 2 of an apparatus, by means of a nut (not shown). To this end, the nipple 1 has an external thread 3 and a grip portion 4 which is located substantially in the central region of the nipple and which may be a hexagonal shoulder or the like. Further, the nipple has an axial through bore 5 which may for example be slightly conical and which, in its lower end in FIG. 1, may have a flared mouth, whereby to reduce the risk of cable breakage.

As further appears from the drawings, the cable lead-in device also comprises a clamping nut or clamping member 6 having an internal thread 7 mating with a corresponding external thread 8 on the nipple, whereby the clamping member can be screwed on the nipple 1.

At its end located at the external thread 8, the nipple 1 has a number of substantially axial fingers 9 separated by longitudinal slots 10. According to the invention, the number of the slots is not critical but may be chosen in dependence upon the dimensions of the cable lead-in device and may, for example, be in the range of 4–20. Further, the slots 10 may be oriented completely radially but may as well be oriented in directions making an angle with a radius of the nipple.

According to the invention, the slots 10 may also be oriented slightly obliquely so as not to be completely parallel to the longitudinal direction of the nipple but curved or helical circumferentially in the direction defined by the direction of tightening of the clamping member 6. Such an inclination in the direction of tightening means that the fingers will yield or bend when the clamping member is tightened, which means in turn that upon rotation of the clamping member in the opppoiste direction, the fingers will tend to rise so as to become oriented more axially. This however results in an increase of the effective length of the fingers which will thus engage the clamping member 6 more firmly in the direction of unscrewing thereof than in the direction of tightening. Such a rearwardly directed inclination of the fingers may thus give enhanced security against unintentional unscrewing of the clamping member from the cable lead-in device.

As appears from the drawings, the free ends of the fingers 9 are bevelled in such a manner that they will together form a substantially conical end surface 11. A mating conical, annular surface 12 is provided in the clamping member 6 at the inner end of the internal thread 7, whereby the end surfaces 11 of the fingers 9 will engage the conical surface 12 when the clamping member 6 is screwed on the nipple 1. (This position is shown in FIG. 1.) If the clamping member 6 is further tightened, the cooperation between the end surfaces 11 of the fingers 9 and the annular, conical surface 12 will cause the fingers 9 to bend radially inwardly so as to clamp about the cable passing through the bore 5. In this manner, it is possible, by suitable tightening the clamping member 6, to achieve efficient clamping around the cable.

In order to obtain optimum sealing through the cable lead-in device but also to increase the friction against the cable, it is suggested according to the invention to use a sealing ring 13 which may be accomodated in an internal groove in the fingers 9 and which, as opposed to what is shown in the figures, may also be substantially open upwardly towards the end surfaces 11 of the fingers. When the clamping member 6 is tightened, the sealing ring 13, which should be of a yielding, resilient material, will of course be compressed and clamped around the cable before or at the same time as the fingers 9 engage and clamp around the cable.

According to the invention, there is arranged in conjunction with the annular conical surface 12 an annular wall 14 service as locking means. The annular wall 14 is directed inwardly in the cable lead-in device, as counted in the longitudinal direction thereof. Further, the annular wall 14 extends radially inwardly in the cable lead-in device, such that the bore extending through the clamping member 6 will have its smallest portion in the opening of the annular wall. In the unloaded state, the diameter of the opening in the annular wall 14 should be slightly less than or equal to the diameter of the cable for which the cable lead-in device is intended. Further, the annular wall 14 should make a marked angle inwardly in the longitudinal direction of the cable lead-in device. As appears from the drawing, this angle may lie in the range of 30°-60° in relation to the longitudinal direction of the cable lead-in device.

As mentioned above, the annular wall 14 is located in conjunction with the conical surface 12 of the clamping member 6. This means that upon tightening of the clamping member 6 on the nipple 1, the end portions of the fingers 9 or the outer end surface of the sealing ring will come into contact with the annular wall 14 and, upon further tightening of the clamping member, they will urge the annular wall axially outwardly. The initial stage of this process is illustrated in FIG. 1. The annular wall will then be deformed, such that the diameter of its through opening tends to decrease, which means that the annular wall will firmly engage the periphery of the cable. At the same time as the annular wall 14, by cooperating with the end portions of the fingers 9, will be brought into a firm engagement with the cable, the fingers will themselves also be pressed into a position of engagement with the cable by cooperating with the conical surface 12.

As appears from the drawings, the annular wall 14 has radial slots 15. These radial slots increase the capability of the annular wall 14 of being pressed outwardly in the axial direction and also increase the diameter reduction of the through opening when such outward pressure is applied. Consequently, this results in an improved engagement with the cable.

According to the invention, the slots 15 need not be completely radial but may extend more or less in a direction approaching the tangential direction to the periphery of the cable. This means that the radially inner ends of the tongues formed between the slots 15 will become asymetrical and have a shape resembling that of barbs or sawteeth, whereby a relative rotation of the clamping member and the cable will be effected substantially more easily in one direction than in the other. Then such an inclination of the slots 15 may be selected as makes it considerably easier to tighten the clamping member 6 than to unscrew it. There is thus provided safety against loosening of the clamping member 6 in that the tooth-shaped inner circumferential edge of the annular wall 14 engages the cable and prevents any relative rotation with respect thereto.

Figure 2:
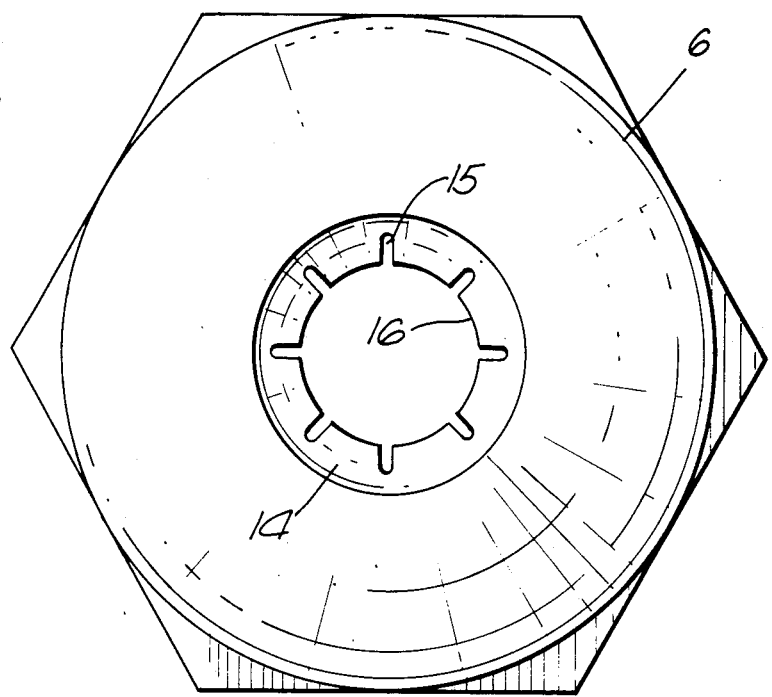
FIG. 2 is an end view of a first embodiment of the clamping nut of the cable lead-in device.

In FIG. 2, there is shown an embodiment in which the slots 15 are completely radial and in which the inner periphery 16 may be regarded as a relatively uniform circular arc.

Figure 3:
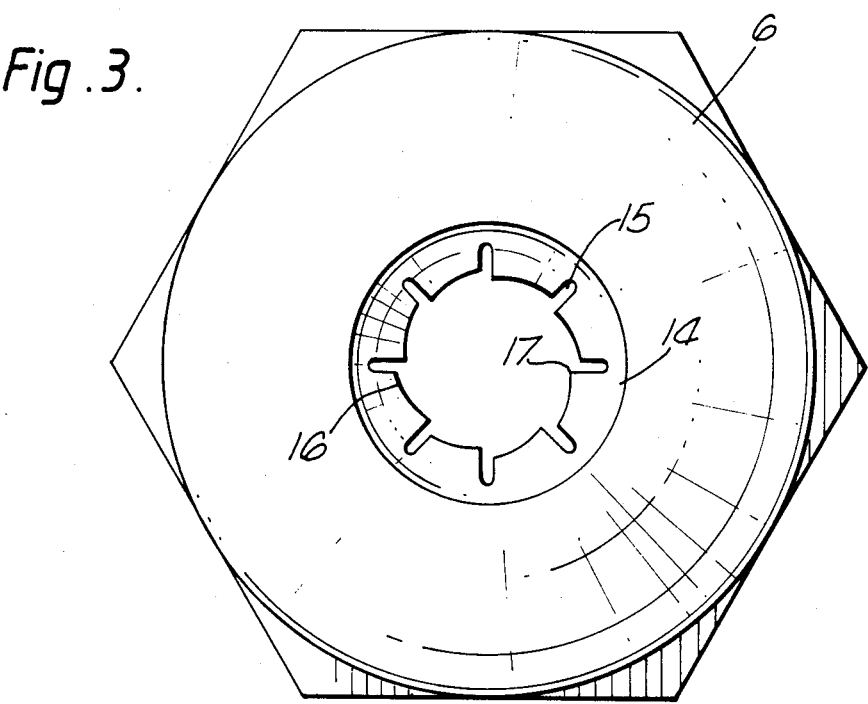
FIG. 3 is an end view of a modified embodiment of the clamping nut of the cable lead-in device.

In FIG. 3, there is shown an embodiment in which the slots 15 are still substantially radial but in which the curves interconnecting the slots are asymmetrical, such that the inner periphery of the annular wall 14 becomes markedly serrated in its contour. As appears, the inner contour thus has a sharp projecting corner 17 at each slot 15.

As appears from the drawings, the annular wall 14 has a thickness tapering radially inwardly. The dimensions of the wall thickness must of course be chosen in dependence upon the bending properties of the wall material since the cooperation of the wall with the end portions 11 of the fingers 9 causes bending of the annular wall. The embodiment illustrated in the drawings has relatively small inner radial end surfaces of the annular wall 14 and of the tongues defined between the slots 15. This of course means that a certain compression of the cable will take place.

According to the invention, the annular wall 14 may however also be given a considerably larger wall thickness than that shown in the drawings, especially in the radially inner edge portion thereof. It is the however necessary that the flexibility of the annular wall be maintained, which may be achieved by providing, in the region where the annular wall joins the rest of the clamping member 6, an annular groove which leaves a bridge of a considerably thinner cross-section, which may then serve as an articulation or joint when the annular wall is being bent. A thus modified embodiment will still yield a very adequate clamping force around the cable but this clamping force is distributed over a larger surface, which may be advantageous in certain applications.

In the above-described embodiments of the clamping nut or clamping member 6 of the cable lead-in device, the clamping member has been made as one piece, preferably of plastic. These embodiments are efficient in most cases and are particularly well suited for cables with an outer sheath of plastic or rubber or in general for cables which are compressible to a certain extent.

However, if the cable has a hard outer sheath, for instance of metal, such as a braided metal hose or a metal hose helically wound or otherwise designed, the cooperation of the locking part 14 with the outer sheath of the cable may need be improved.

Figure 5:
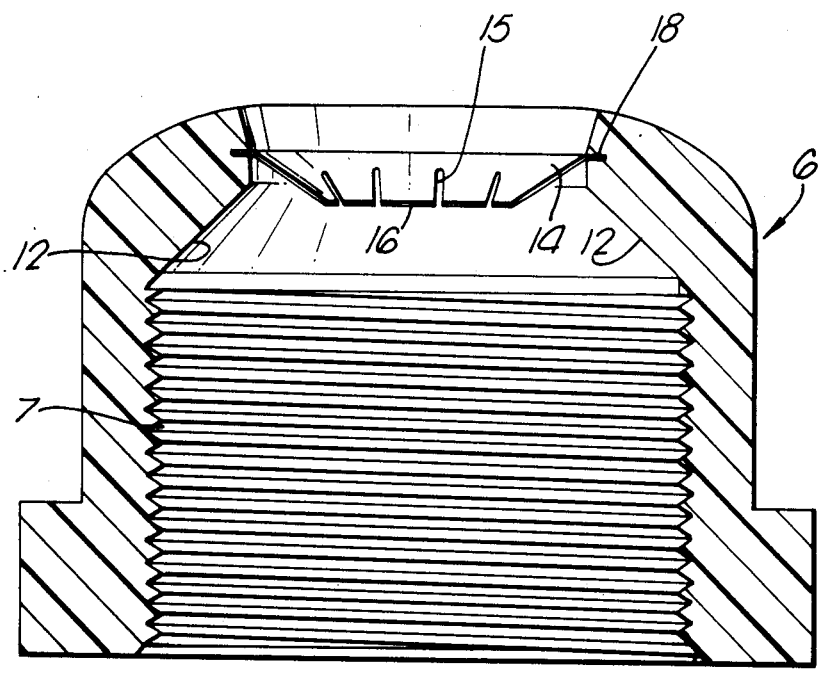
FIG. 5 is a modified embodiment of the clamping nut of the cable lead-in device.

In FIG. 5, there is shown an embodiment in which the annular wall 14 is made as a separate part, preferably a washer of resilient metal. This washer is conical in its central region and, along its periphery, has fixing means 18 which non-rotatably secures the washer to the clamping member 6. As illustrated in the drawing, the fixing means 18 may be embedded in the material of the clamping member 6 and, to safely prevent any rotation, may be slightly undulated or toothed at the edge.

As an alternative of embedding the washer in the clamping member 6, this may be provided at its through opening with an abutment and, inwardly thereof (in the direction of the thread 7), with a slightly widened portion, such that the washer can be pressed with force fit into said portion for correctly engaging the abutment. In order to further improve the fixing of the washer, the widened portion of the opening of the clamping member 6, adjacent said abutment, may have an annular bead or a number of lugs past which the washer must be pressed when it is mounted against the abutment.

Also in this embodiment, the edge portion 16 of the washer may suitably be serrated, undulated or otherwise non-rotationally symmetrical, and the portion of the clamping member 6 adapted to cooperate with the washer may of course be given a corresponding or complementary design, so as to achieve a positive engagement preventing relative rotation.

As regards the design of the central portion of the washer, i.e. the portion cooperating with the outer sheath of the cable and the fingers 9, reference is made to that stated above with respect to FIGS. 1–4.

The invention may be further modified within the spirit and scope of the accompanying claims.

I claim:

1. A cable lead-in device comprising:
 a nipple member having external threads and a bore for receiving a cable, said nipple member having first clamping means movable to contact and clamp the cable within the nipple member, said first clamping means having first operating means;
 a nut member having a bore for receiving said cable and internal threads to cooperate with said external threads and a second operating means to cooperate with said first operating means to produce said clamping contact when tightening said nut member; said nut member further having a second clamping means extending obliquely inwardly and surrounding said cable, said first clamping means and said nut member having cooperating surfaces to move said second clamping means when tightening said nut member to a position substantially, axially outwardly to clampingly engaging the cable.

2. A device as claimed in claim 1, wherein said second clamping means is a substantially conical annular wall surrounding the bore of the nut member, the first clamping means including a predetermined number of substantially axial fingers disposed at one end of the nipple member and surrounding the bore of the nipple member, said fingers having free end portions, adapted to displace the annular wall axially outwardly upon tightening of the clamping member.

3. A device as claimed in claim 2, wherein the fingers disposed at one end of the nipple are directed obliquely in relation to the axial direction of the nipple to counteract relative rotation in a predetermined direction between the nipple and the nut member.

4. A dvice as claimed in claim 1, wherein the second clamping means is elements to allow relative rotation between the second clamping means and the cable in one direction only.

5. A device as claimed in claim 1, wherein the second clamping means is provided with a predetermined number of slots extending outwardly from an inner edge engaging the cable.

6. A device as claimed in claim 5, wherein the slots are substantially radial.

7. A device as claimed in claim 5, wherein the slots are at an angle with respect to radii of the bore of the nut member.

8. A device as claimed in claim 1, wherein the second clamping means is non-rotatably connected to the nut member.

9. A device as claimed in claim 1, wherein the second clamping means is a substantially conical washer of metal retained in the nut member.

10. A cable lead-in device comprising:
 a nipple member having a bore for receiving a cable and external threads for cooperating with corresponding threads on a nut member for axially moving said nut member relative to said nipple member; first clamping means provided on said nipple member, said first clamping means and said nut member having cooperating actuating surfaces to move said first clamping means to a position clampingly engaging said cable when said nut member is axially moved relative to said nipple member;
 second clamping means provided on said nut member, said second clamping means being directed obliquely inwardly towards said cable and against the direction of axial movement of said nipple member in said nut member, said second clamping means being positioned to be engaged by said first clamping means and moved substantially, axially outwardly to a position clampingly engaging said cable when said relative axial movement between said nut member and said nipple member occurs.

11. A device as claimed in claim 10, wherein said second clamping means is a substantially conical annular wall surrounding the bore of the nut member, the first clamping means including a predetermined number of substantially axial fingers disposed at one end of the nipple member and surrounding the bore of the nipple member, said fingers having free end portions adapted to displace the annular wall axially outwardly upon tightening of the clamping member.

12. A device as claimed in claim 10, wherein the second clamping means is provided with teeth elements to allow relative rotation between the second clamping means and the cable in one direction only.

13. A device as claimed in claim 10, the second clamping means is provided with a predetermined number of slots extending outwardly from an inner edge engaging the cable.

14. A device as claimed in claim 13, wherein the slots are substantially radial.

15. A device as claimed in claim 13, wherein the slots are at an angle with respect to radii of the bore of the nut member.

16. A device as claimed in claim 10, wherein the second clamping means is non-rotatably connected to the nut member.

17. A device as claimed in claim 10, wherein the second clamping means is a substantially conical washer of metal retained in the nut member.

18. A cable lead-in device comprising:
 a nipple member having a bore for receiving a cable and external threads for cooperating with corresponding threads on a nut member for axially moving said nut member relative to said nipple member;
 first clamping means provided on said nipple member, said first clamping means including a number of fingers extending longitudinally around said bore, said first clamping means and said nut member having conical cooperating actuating surfaces to move said first clamping means to a position clampingly engaging said cable when said nut member is axially moved relative to said nipple member;

second clamping means provided on said nut member, said second clamping means having fingers directed obliquely inwardly towards said cable and axially against the direction of movement of said nipple member relative to said nut member, said fingers positioned to be contacted by said first clamping means and moved thereby substantially axially, outwardly to a position clampingly engaging said cable when said relative axial movement between said nipple member and said nut member occurs.

19. A device as claimed in claim 18, wherein the second clamping means is provided with teeth elements to allow relative rotation between the second clamping means and the cable in one direction only.

20. A device as claimed in claim 18, the second clamping means is provided with a predetermined number of slots extending outwardly from an inner edge engaging the cable.

* * * * *